(12) United States Patent
Mori (10) Patent No.: US 7,609,596 B2
(45) Date of Patent: Oct. 27, 2009

(54) STORAGE APPARATUS AND COMPUTER-READABLE STORAGE MEDIUM

(75) Inventor: Mamoru Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 643 days.

(21) Appl. No.: 11/231,392

(22) Filed: Sep. 21, 2005

(65) Prior Publication Data
US 2006/0285462 A1 Dec. 21, 2006

(30) Foreign Application Priority Data
Jun. 20, 2005 (JP) .............................. 2005-179108

(51) Int. Cl.
*G11B 7/00* (2006.01)
(52) U.S. Cl. .................. 369/53.17; 369/47.14
(58) Field of Classification Search ............. 369/47.14, 369/53.17
See application file for complete search history.

(56) References Cited

U.S. PATENT DOCUMENTS 5,909,334 A * 6/1999 Barr et al. ..................... 360/53

6,854,022 B1 * 2/2005 Thelin ........................... 710/5

FOREIGN PATENT DOCUMENTS

| JP | 7-176142 | 7/1995 |
| JP | 11-167751 | 6/1999 |

OTHER PUBLICATIONS

Machine translation of JP 7-176142, Jul. 14, 1995.*

* cited by examiner

*Primary Examiner*—Wayne R Young
*Assistant Examiner*—Adam R Giesy
(74) *Attorney, Agent, or Firm*—Greer, Burns & Crain, Ltd.

(57) ABSTRACT

A storage apparatus carries out a write verify process to verify whether or not information is correctly written immediately after writing the information in a write target region of a recording medium. The storage apparatus judges whether or not a plurality of defective regions on the recording medium where a verify process failed are arranged along a radial direction of the recording medium if a number of retry processes of the verify process with respect to the write target region exceeds a first threshold value, and reduces a second threshold value of a number of write retry processes if the plurality of defective regions are arranged along the radial direction of the recording medium.

16 Claims, 6 Drawing Sheets

STORAGE APPARATUS AND COMPUTER-READABLE STORAGE MEDIUM

BACKGROUND OF THE INVENTION

1. Field of the Invention

The present invention generally relates to storage apparatuses and computer-readable storage media, and more particularly to a storage apparatus that carries out a write verify process in which information is written on a recording medium and an inspection is made immediately thereafter to verify whether or not the information was written correctly, and to a computer-readable storage medium which stores a program for causing a computer to carry out such a write verify process.

2. Description of the Related Art

In the case of a magneto-optical disk drive, for example, the laser power condition required to write information on and to read information from a magneto-optical disk is set to a value that is set in advance or determined by a test write. A verify process is carried out immediately after writing information on the magneto-optical disk under the set laser power condition, so as to verify whether or not the information was written correctly. If the information is not written correctly and cannot be verified, the write and/or read conditions are changed and a retry process is carried out up to a predetermined number of times. If the information cannot be verified even after the retry process is carried out the predetermined number of times, it is judged that a sector of the magneto-optical disk to which the information is written is a defective sector, and an alternate process is carried out to skip to an alternate area on the magneto-optical disk.

When carrying out the retry process, the laser power is varied and the magnetic field condition is varied in some cases, in order to cope with the inconsistency in the test write operation, the change in the environment condition such as the temperature, the inconsistency in the test write operation caused by the combination of the magneto-optical disk drive and the magneto-optical disk, and the shift in the sensitivity of the magneto-optical disk. Particularly due to the recent considerable increase in the recording density, there is a tendency for the tolerable error from the optimum write laser power, that is, the power margin, to decrease. But since the power margin is greatly affected by the inconsistencies described above, it is not possible to simply reduce the number of times the retry process is carried out.

In the case where minute defects that could not be registered by a media manufacturer as initial defects exist on the recording medium or, foreign particles such as dust particles adhere on the recording medium after the defect registration, the write verify process as a whole requires an extremely long processing time, because the alternate process is carried out after carrying out the retry process with respect to all of the specified plurality of tracks on the recording medium. For this reason, in some cases, a command time-out may occur in a host unit or, a freezing of an operation screen may occur in the host unit. Particularly when a write cache of the storage apparatus is valid and continuous data are written in one operation, a command process spanning several tens of tracks is generated, and there was a problem in that the probability of the time-out or freezing occurring becomes high, because of the time required to carry out the retry process and the alternate process.

In addition, when the retry process is carried out a large number of times, the writing is made with respect to the sector on the recording medium where the read success rate is low. Consequently, there was a problem in that the a read error may be generated, when the environment condition of the storage apparatus is later changed or, the information is later read from this recording medium by another storage apparatus.

The problems described above are not limited to the magneto-optical disk drive, and similar problems were also encountered in storage apparatuses that are designed to carry out the write verify process with respect to a recording medium such as an optical disk and a magnetic disk.

SUMMARY OF THE INVENTION

Accordingly, it is a general object of the present invention to provide a novel and useful storage apparatus and a computer-readable storage medium in which the problems described above are suppressed.

Another and more specific object of the present invention is to provide a storage apparatus and a computer-readable storage medium that can reduce a processing time of a write verify process and reduce the probability of a time-out or freezing from occurring, so as to suppress the generation of a read error.

Still another object of the present invention is to provide a storage apparatus which carries out a write verify process to verify whether or not information is correctly written immediately after writing the information in a write target region of a recording medium, comprising a part configured to judge whether or not a plurality of defective regions on the recording medium where a verify process failed are arranged along a radial direction of the recording medium, if a number of retry processes of the verify process with respect to the write target region exceeds a first threshold value; and a part configured to reduce a second threshold value of a number of write retry processes, if the plurality of defective regions are arranged along the radial direction of the recording medium. According to the storage apparatus of the present invention, it is possible to reduce the processing time of the write verify process and reduce the probability of the time-out or freezing from occurring, so as to suppress the generation of the read error.

A further object of the present invention is to provide a storage apparatus which carries out a write verify process to verify whether or not information is correctly written immediately after writing the information in a write target region of a recording medium, comprising a part configured to judge whether or not a defective region on the recording medium where a write retry process failed and a defective region on the recording medium where a servo error is generated are arranged along a radial direction of the recording medium, if a number of write retry processes of the verify process with respect to the write target region exceeds a first threshold value; and a part configured to reduce the threshold value, if the defective region where the write retry process failed and the defective region where the servo error is generated are arranged along the radial direction of the recording medium. According to the storage apparatus of the present invention, it is possible to reduce the processing time of the write verify process and reduce the probability of the time-out or freezing from occurring, so as to suppress the generation of the read error.

Another object of the present invention is to provide a computer-readable storage medium which stores a program for causing a computer to carry out a write verify process to verify whether or not information is correctly written immediately after writing the information in a write target region of a recording medium, the program comprising a procedure causing the computer to judge whether or not a plurality of defective regions on the recording medium where a verify process failed are arranged along a radial direction of the recording medium, if a number of retry processes of the verify process with respect to the write target region exceeds a first threshold value; and a procedure causing the computer to reduce a second threshold value of a number of write retry processes, if the plurality of defective regions are arranged along the radial direction of the recording medium. According to the computer-readable storage medium of the present invention, it is possible to reduce the processing time of the write verify process and reduce the probability of the time-out or freezing from occurring, so as to suppress the generation of the read error.

Still another object of the present invention is to provide a computer-readable storage medium which stores a program for causing a computer to carry out a write verify process to verify whether or not information is correctly written immediately after writing the information in a write target region of a recording medium, the program comprising a procedure causing the computer to judge whether or not a defective region on the recording medium where a write retry process failed and a defective region on the recording medium where a servo error is generated are arranged along a radial direction of the recording medium, if a number of write retry processes of the verify process with respect to the write target region exceeds a first threshold value; and a procedure causing the computer to reduce the threshold value, if the defective region where the write retry process failed and the defective region where the servo error is generated are arranged along the radial direction of the recording medium. According to the computer-readable storage medium of the present invention, it is possible to reduce the processing time of the write verify process and reduce the probability of the time-out or freezing from occurring, so as to suppress the generation of the read error.

Other objects and further features of the present invention will be apparent from the following detailed description when read in conjunction with the accompanying drawings.

DESCRIPTION OF THE PREFERRED EMBODIMENTS

As described above, it is not possible to simply reduce the number of times the retry process is carried out, due to the reduced power margin and the various inconsistencies.

Hence, in the present invention, if defective sectors arranged in a radial direction of a recording medium are detected when carrying out the verify process during the write verify process, it is judged that these defective sectors are caused by foreign particles such as dust particles, and the alternate process is carried out without reducing the number of time the retry process is carried out or, without carrying out the retry process, with respect to these defective sectors.

Figure 1:
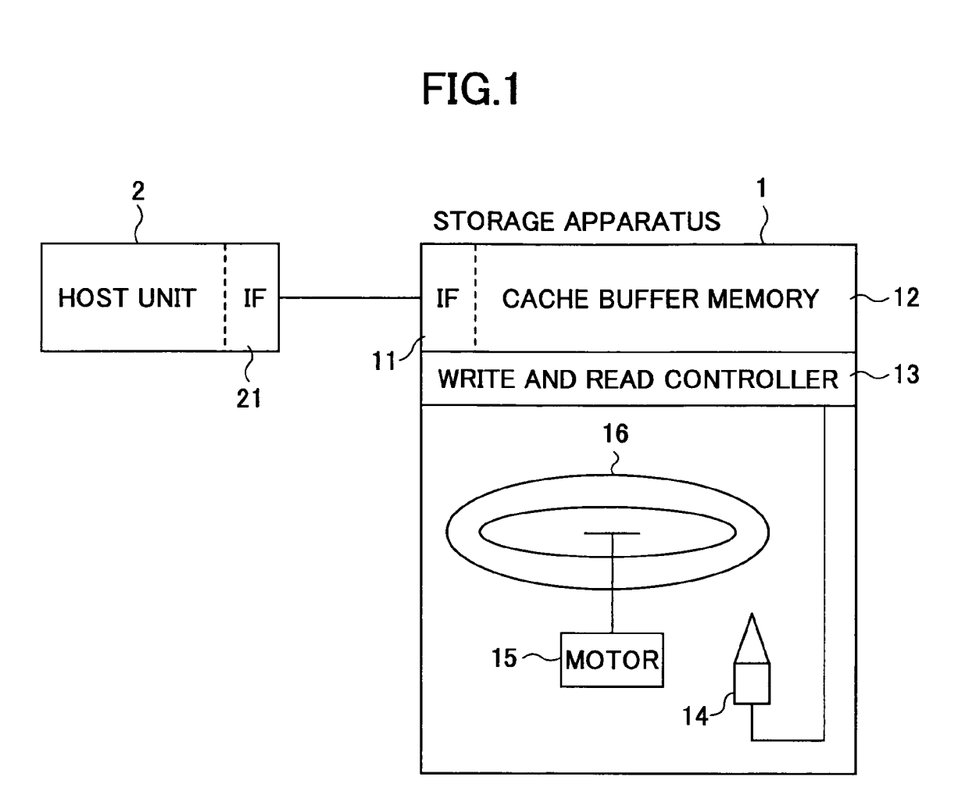
FIG. 1 is a diagram showing an important part of an embodiment of a storage apparatus according to the present invention.

FIG. 1 is a diagram showing an important part of an embodiment of a storage apparatus according to the present invention. In this embodiment of the storage apparatus, the present invention is applied to a magneto-optical disk drive.

In FIG. 1, a storage apparatus 1 has a basic structure including an interface (IF) part 11, a cache buffer memory 12 that is used as a storage part, a write and read controller 13, a head 14, and a spindle motor 15. This basic structure itself is known, but it is of course possible to employ other known basic structures for the storage apparatus 1. A magneto-optical disk 16 that is used as a recording medium is rotated by the spindle motor 15 according to a known method. The magneto-optical disk 16 may be removable with respect to the storage apparatus 1, that is loadable and unloadable with respect to the storage apparatus 1.

On the other hand, a host unit 2 is formed by a personal computer or the like having a known structure, and an interface (IF) part 21. The interface part 21 of the host unit 2 and the interface part 11 of the storage apparatus 1 are connected by a cable or a wireless connection.

When a write command (or a write request) is issued from the host unit 2, the write command is supplied to the write and read controller 13 within the storage apparatus 1, via the interface parts 21 and 11. The write and read controller 13 is formed by a memory and a processor such as a CPU. The write and read controller 13 controls a moving mechanism (not shown) or the like to move the head 14 depending on address information included in the write command, and controls a delayed write process that temporarily stores write data obtained from the host unit 2 in the cache buffer memory 12 before writing the write data on the magneto-optical disk 16.

On the other hand, when a read command (or a read request) is issued from the host unit 2, the read command is supplied to the write and read controller 13 within the storage apparatus 1, via the interface parts 21 and 11. The write and read controller 13 controls the moving mechanism or the like to move the head 14 depending on the address information included in the read command, and a read process that temporarily stores the data read from the magneto-optical disk 16 in the cache buffer memory 12 before supplying the read data to the host unit 2 via the interface parts 11 and 21.

Figure 2:
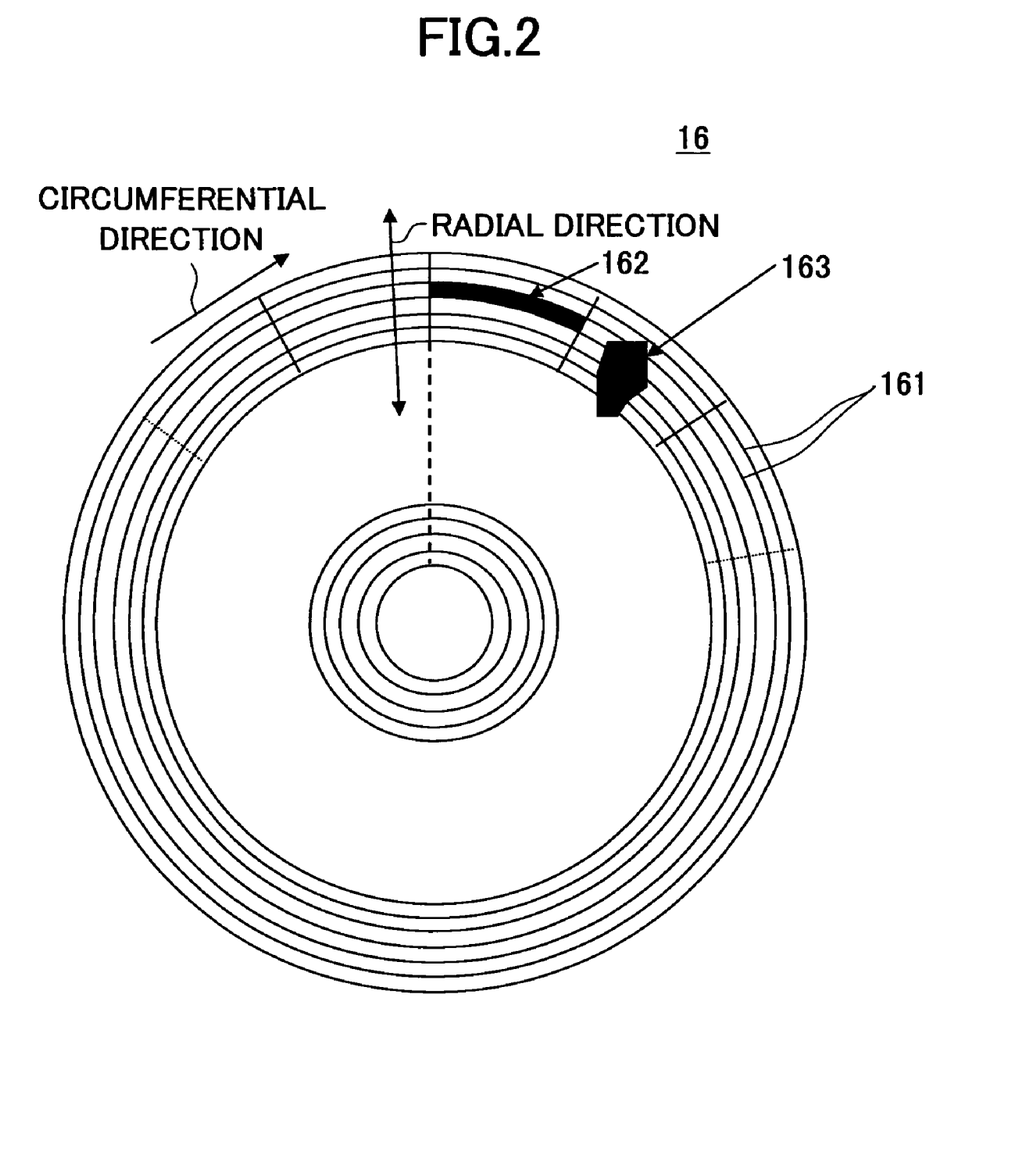
FIG. 2 is a diagram showing a state where a foreign particle such as a dust particle is adhered on a magneto-optical disk.

FIG. 2 is a diagram showing a state where a foreign particle 163 such as a dust particle is adhered on the magneto-optical disk 16. In other words, FIG. 2 shows a state where a defect exists on the magneto-optical disk 16. As shown in FIG. 2, concentric tracks 161 or a spiral track 161 are provided in a recording region on the magneto-optical disk 16. The recording region is segmented into a plurality of sectors 162 and a plurality of zones. Each sector 162 extends in the radial direction, while each zone extends in the circumferential direction (write and read direction). The sectors 162 are arranged along the circumferential direction, and the zones are arranged along the radial direction.

In FIG. 2, the pitch of the tracks 161, the intervals of the sectors 162, and the size of the foreign particle 163 are shown on an enlarged scale for the sake of convenience. However, the actual pitch of the tracks 161 is approximately 1 μm, the actual intervals of the sectors 162 are several mm, and the actual size of the foreign particle 163 is approximately several hundreds of μm. It is rare for the foreign particle 163 to span the sectors 162 that are mutually adjacent in the circumferential direction, and in virtually all cases, the foreign particle 163 spans several hundreds of tracks 161 in the radial direction.

Figure 3:
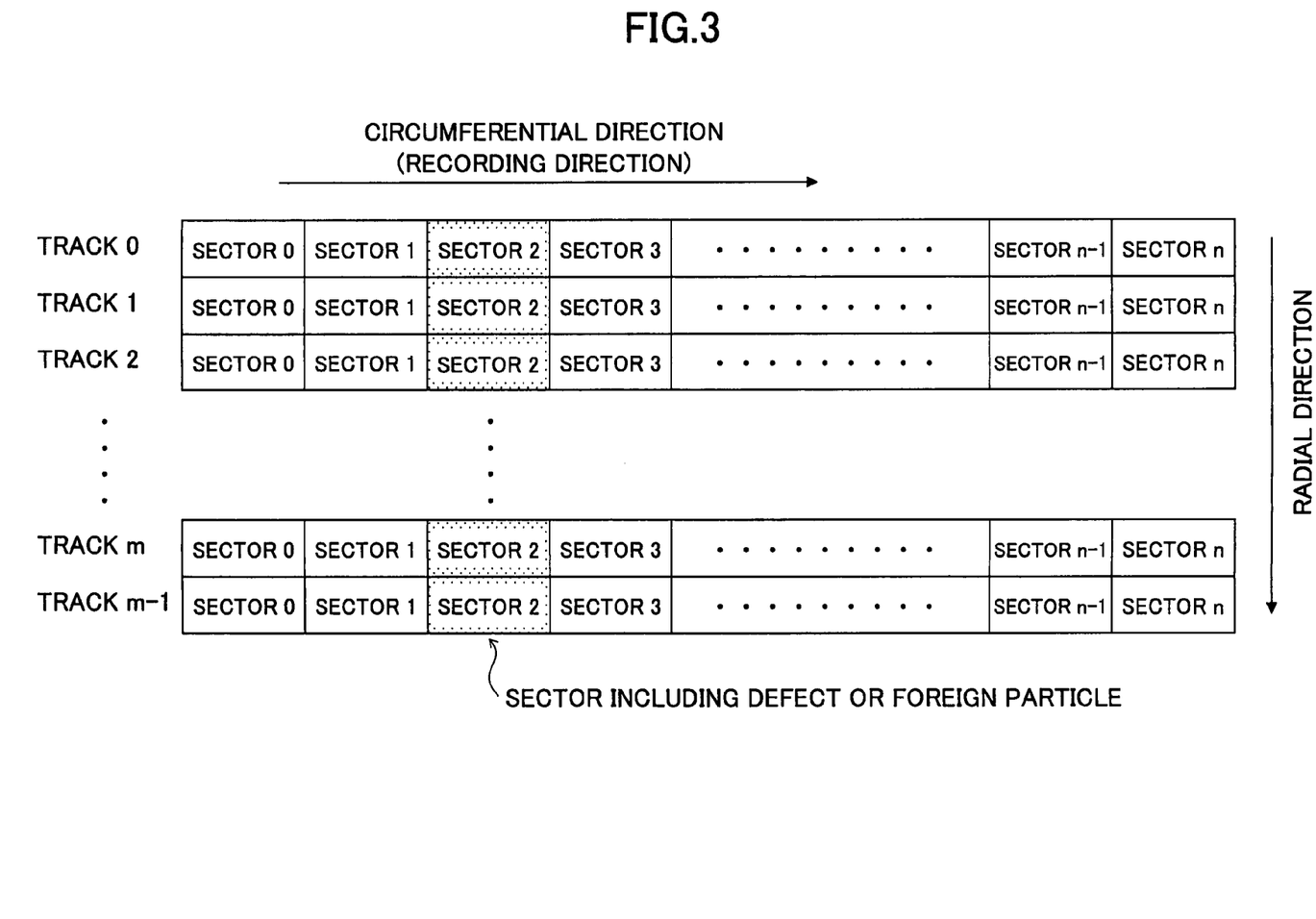
FIG. 3 is a diagram showing a portion where the foreign particle such as the dust particle is adhered on the magneto-optical disk, segmented in a circumferential direction and a radial direction (for every physical track)
Figure 4:
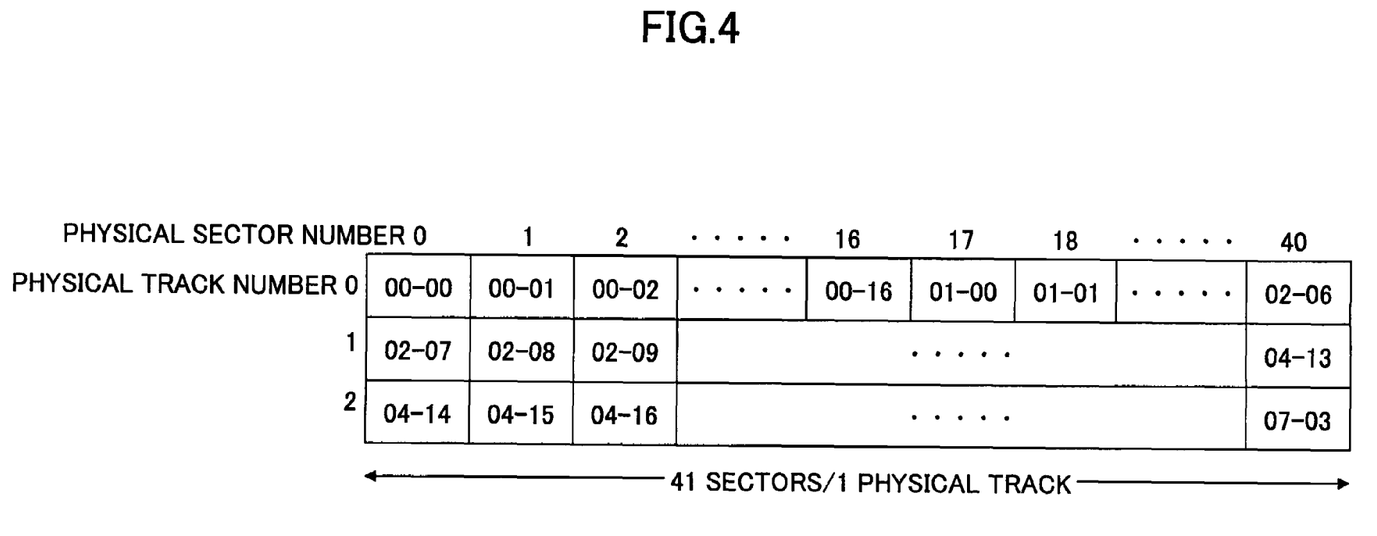
FIG. 4 is a diagram showing the portion where the foreign particle such as the dust particle is adhered on the magneto-optical disk, segmented in the circumferential direction and the radial direction (for every physical track)

FIGS. 3 and 4 are diagrams showing a portion where the foreign particle 163 such as the dust particle is adhered on the magneto-optical disk 16, segmented in the circumferential direction and the radial direction (for every physical track).

FIG. 3 shows a case where the foreign particle 163 such as the dust particle exists in the sector 162 having a sector number 3 of each of the tracks 161, and this foreign particle 163 extends to the mth track 161. The number n of sectors 162 in FIG. 3 differs depending on the storage capacity and the zones of the magneto-optical disk 16. The number m of tracks 161 changes depending on a relationship between the size of the foreign particle 163 and the pitch of the tracks 161.

FIG. 4 shows a relationship of the physical tracks or physical sectors and the logical tracks or logical sectors. For the sake of convenience, FIG. 4 shows an outermost zone of the magneto-optical disk 16 having a storage capacity of 1.3 GB. In FIG. 4, numerals within each box indicates the "logical track number-logical sector number". The address information that is actually written on the magneto-optical disk 16 is the logical track or logical sector, and in the case of a recording technique having 2048 bytes per sector, there are 17 sectors (sectors 0 to 16) per logical track. For this reason, the value of the physical track or physical sector and the value of the logical track or logical sector generally do not match. In the case where the ZCAV system is employed, the number of physical sectors per physical track differs depending on the storage capacity and the number of zones of the magneto-optical disk 16, and thus, in order to obtain the number of physical sectors per logical track in a zone having a certain zone number, it is necessary to know the type of the magneto-optical disk 16 and to make a transformation from the physical track or physical sector to the logical track or logical sector using the zone number that is presently being used. Since FIG. 4 shows a zone Zone0 of the magneto-optical disk 16 having the storage capacity of 1.3 GB, there are 41 physical sectors per physical track. But there are 40 physical sectors per physical track in a zone Zone1, and there are 39 physical sectors per physical track in a zone Zone2, and the number of physical sectors per physical track changes depending on the zone. On the other hand, in the case of a magneto-optical disk having a storage capacity of 640 MB, there are 15 physical sectors per physical track in a zone Zone0, and there are 16 physical sectors per physical track in a zone Zone1. Hence, the number of physical sectors per physical track also differs depending on the type of the magneto-optical disk, that is, the recording medium.

Figure 5:
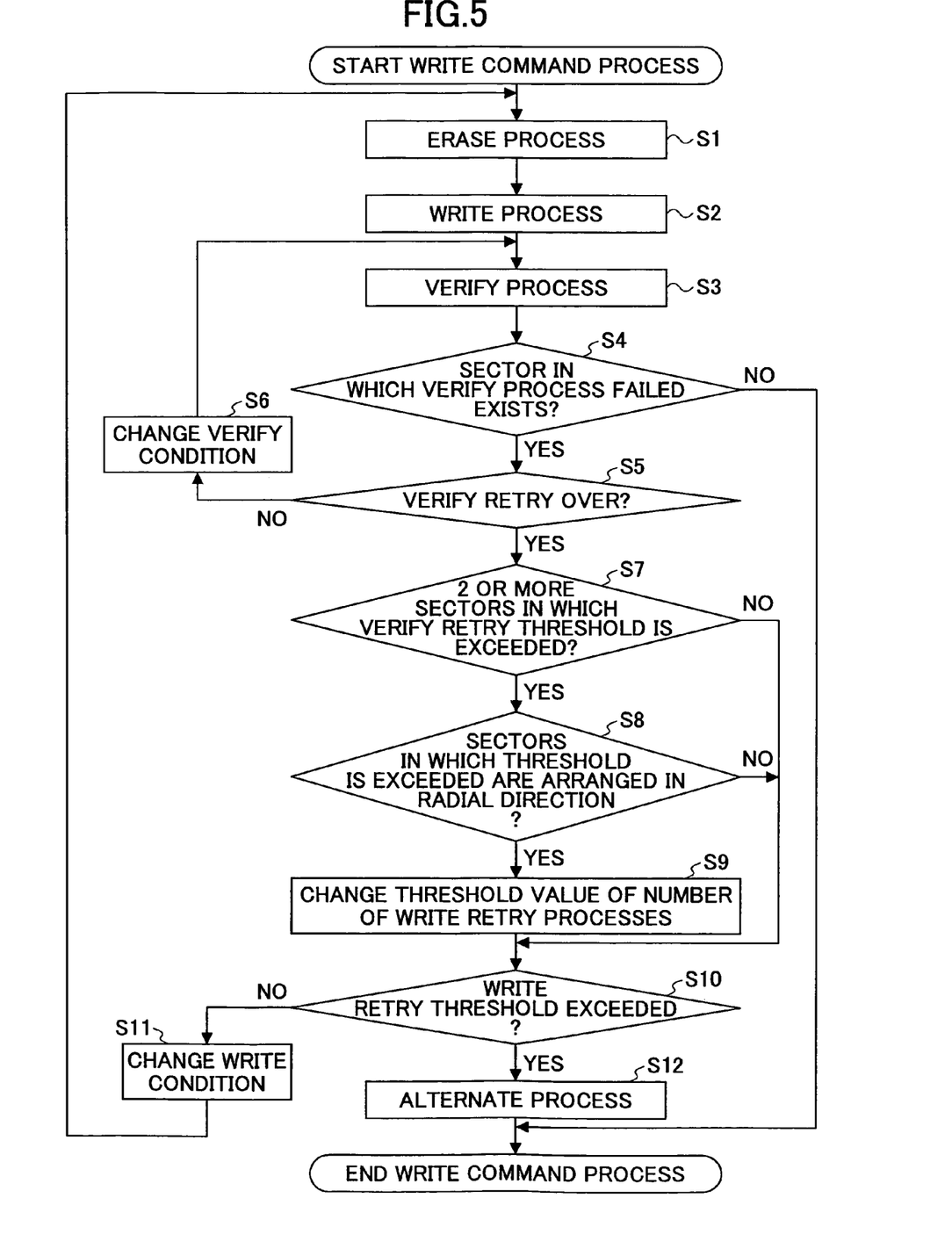
FIG. 5 is a flow chart for explaining an operation of the embodiment of the storage apparatus.

FIG. 5 is a flow chart for explaining an operation of this embodiment of the storage apparatus. The process shown in FIG. 5 is carried out by the processor within the write and read controller 13. In the following description, a "write retry process" refers to a process in which the verify process is carried out with respect to all of the number of processing sectors specified by the write command, the sector in which the verify process failed is stored, and the retry process is carried out only with respect to the sector in which the verify process failed.

In FIG. 5, when a write command process is started in response to the write command from the host unit 2, a step S1 carries out an erase process to erase information that is written in a write target region (sector) on the magneto-optical disk 16 to which the write process is to be carried out. A step S2 carries out the write process, and writes the write data from the host unit 2 to the write target region. A step S3 reads the write data that is written in the step S2, and carries out the verify process to judge whether or not the write process is carried out normally. A step S4 decides whether or not there is a sector in which the verify process failed, and the process ends if the decision result in the step S4 is NO.

If the decision result in the step S4 is YES, a step S5 decides whether or not the number of retry processes during the verify process (the number of verify retry processes) exceeds a threshold value (that is, whether or not the verity retry is over). If the decision result in the step S5 is NO, a step S6 changes the condition of the verity process, and the process returns to the step S3. On the other hand, if the decision result in the step S5 is YES, a step S7 decides whether or not there are a plurality of sectors (for example, 2 sectors) in which the number of verify retry processes exceeds the threshold value. The process advances to a step S10 if the decision result in the step S7 is NO. If the decision result in the step S7 is YES, a step S8 decides whether or not the sectors in which the number of retry processes during the verify process exceeds the threshold value are arranged along the radial direction of the magneto-optical disk 16, based on the sector addresses. The process advances to the step S10 if the decision result in the step S8 is NO. If the decision result in the step S8 is YES, a step S9 changes the threshold value of the number of retry processes during the write process (that is, the number of write retry processes). More particularly, the step S9 reduces the threshold value of the number of write retry processes.

The step S10 decides whether or not the number of write retry processes exceeds the threshold value thereof. If the decision result in the step S10 is NO, a step S11 changes the condition of the write process, and the process returns to the step S1. On the other hand, if the decision result in the step S10 is YES, a step S12 carries out an alternate process with respect to the write target region, and the process ends.

Conventionally, when the foreign particle such as the dust particle exists in a sector on the recording medium, and the retry process fails even after carrying out the retry process a predetermined number of times with respect to this sector, the alternate process is carried out with respect to this sector.

On the other hand, according to this embodiment, if there are a plurality of sectors (for example, 2 sectors) in which the number of verify retry processes exceeds the threshold value, the decision is made, based on the sector addresses, to determine whether or not the sectors that could not be remedied by the verify retry process are arranged along the radial direction of the recording medium. As described in conjunction with FIG. 4, the transformation from the physical track or physical sector to the logical track or logical sector is required in order to decide whether or not the sectors that could not be remedied by the verify retry process are arranged along the radial direction of the recording medium. However, such a transformation can easily be made by computation, since the type of the recording medium and the zone of the recording medium used are known. Various computation methods may be employed for this computation, because it is simply necessary to judge whether or not the physical sector positions match. However, since such computation methods are not directly related to the subjected matter of the present invention, a description of such computation methods will be omitted in this specification.

If the sectors that could not be remedied by the verify retry process are generated at random and are not arranged along the radial direction of the recording medium, a write retry process similar to that of the conventional storage apparatus may be carried out. On the other hand, if the sectors that could not be remedied by the verify retry process are arranged along the radial direction of the recording medium, the threshold value of the number of write retry processes is changed, and if the threshold value is set to zero, for example, the write retry process is not carried out with respect to the sectors that could not be remedied by the verify retry process and the alternate process is carried out immediately. The threshold value may be changed flexibly, by taking into consideration the time it takes from the write retry process to the alternate process (apparatus performance) and the time-out time (system structure). If the write retry time has a sufficient margin until the time-out time, it is possible to carry out some write retry process so as to reduce the probability of generating the alternate process.

In addition, it is possible to flexibly change the threshold value between the case where a large number of sectors that could not be remedied by the verify retry process are arranged along the radial direction of the recording medium, and the case where a small number of sectors that could not be remedied by the verify retry process are arranged along the radial direction of the recording medium.

In the case described above, the alternate process is carried out when the verify process after the write process fails. However, the present invention is similarly applicable to the alternate process that is carried out when a servo error is generated during the erase and write process. Further, the retry method when carrying out the verify process was described above under the precondition that the retry process is carried out after carrying out the erase and write process with respect to all of the series of processing blocks, but the retry process with respect to the servo error during the erase and write process is carried out at a time when the servo error is generated, that is, during the erase and write process. In this case, it is not possible to judge the distribution of the defective sectors for the processing blocks in their entirety. However, in a case where the sector in which the servo error was previously (first) generated and the time-out of the retry process occurred, and the sector in which the servo error was next generated, are arranged along the radial direction of the recording medium, it is possible to reduce the processing time of the retry process similarly as in the case of the verify process, by changing the threshold value of the number of retry processes.

Figure 6:
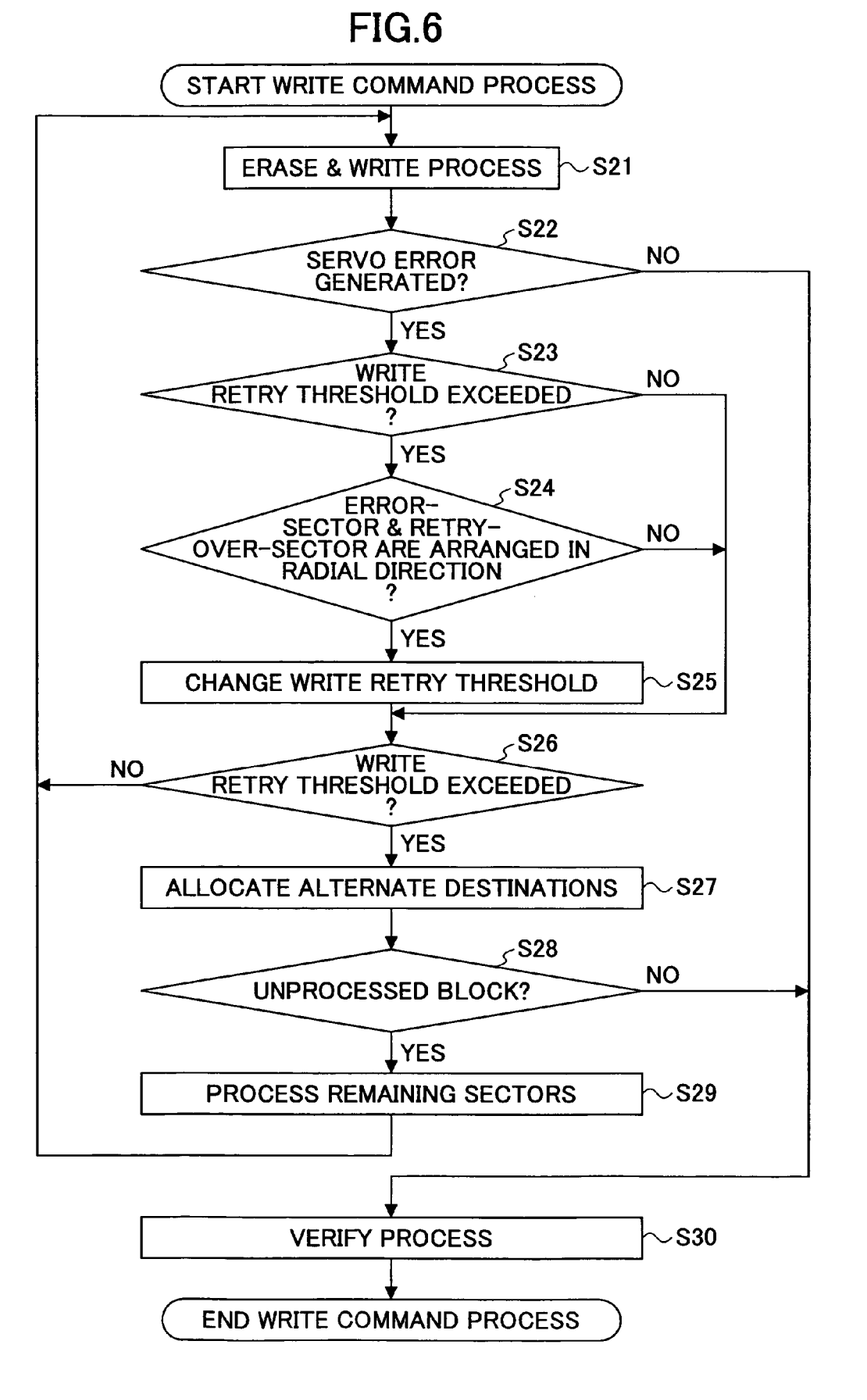
FIG. 6 is a flow chart for explaining an operation of the embodiment of the storage apparatus when an alternate process is generated during an erase and write process.

FIG. 6 is a flow chart for explaining an operation of this embodiment of the storage apparatus when the alternate process is generated during the erase and write process. In FIG. 6, when the write command process is started in response to the write command from the host unit 2, a step S21 carries out the erase and write process to erase the information that is written in the write target region (sector) on the magneto-optical disk 16 to which the write process is to be carried out, and writes the write data from the host unit 2 to the write target region. A step S22 decides whether or not the servo error is generated. If the decision result in the step S22 is NO, a step S30 carries out the verify process, and the process ends. On the other hand, if the decision result in the step S22 is YES, a step S23 decides whether or not the number of write retry processes has already exceeded the threshold value, that is, whether or not the retry over has occurred. If the decision result in the step S23 is NO, the process advances to a step S26 which will be described later.

If the decision result in the step S23 is YES, a step S24 decides whether or not the error-sector in which the servo error was generated and the retry-over-sector in which the retry over has occurred are arranged along the radial direction of the magneto-optical disk 16. The process advances to the step S26 which will be described later, if the decision result in the step S24 is NO. On the other hand, if the decision result in the step S24 is YES, a step S25 changes the threshold value of the number of write retry processes, and the process advances to the step S26.

The step S26 decides whether or not the threshold value of the number of write retry processes has been exceeded, that is, whether or not the retry over has occurred. The process returns to the step S21 if the decision result in the step S26 is NO. If the decision result in the step S26 is YES, a step S27 allocates alternate destinations with respect to the defective sectors including the error-sector and the retry-over-sector. A step S28 decides whether or not an unprocessed block exists, and the process advances to a step S30 if the decision result in the step S28 is NO. If the decision result in the step S28 is YES, a step S29 advances to the processing with respect to the remaining sectors, and the process returns to the step S21.

In the embodiment described above, the storage apparatus was described by taking the magneto-optical disk drive as an example. However, the recording medium is not limited to the magneto-optical disk, and the present invention is similarly applicable to any type of storage apparatus which is designed to carry out the verify process after the write process and to carry out the write retry process. In other words, the present invention is similarly applicable to an optical disk drive, a magnetic disk drive and the like.

According to the present invention, if the conventional method required 6 retry processes including the default condition, for example, the present invention would only require 1 retry process, and enable the processing time of the retry process to be reduced to ⅙. Hence, it is possible to reduce the possibility of generating the time-out and the freezing described above. In addition, because the alternate process can be carried out accurately with respect to the sector in which the foreign particle such as the dust particle exists on the recording medium, it is possible to also reduce the probability of generating the read error when the environment condition or the storage apparatus changes.

In addition, the present invention can be realized by firmware, and it is unnecessary to add complicated hardware or exclusive hardware. In other words, the present invention may be realized by simply modifying the existing program that is executed by the processor of the write and read controller 13. Therefore, the present invention also includes a program which causes a computer to carry out the above described process of the storage apparatus, and also includes a computer-readable storage medium which stores such a program. The computer-readable storage medium may be formed by any kind of media capable of storing the program, such as magnetic recording media, optical recording media, magneto-optical recording media, and semiconductor memory devices.

This application claims the benefit of a Japanese Patent Application No.2005-179108 filed Jun. 20, 2005. in the Japanese Patent Office, the disclosure of which is hereby incorporated by reference.

Further, the present invention is not limited to these embodiments, but various variations and modifications may be made without departing from the scope of the present invention.

What is claimed is:

1. A storage apparatus comprising:

a recording medium;

a head configured to write information on and read information from the recording medium; and a controller configured to control the head to carry out a write verify porocess which verifies whether or not information is correctly written by reading the information immediately after writing the information in a write target region of the recording medium, wherein the controller is further configured to:

judge whether or not a plurality of defective regions on the recording medium where a verify process failed are arranged along a radial direction of the recording medium, if a number of retry processes of the verify process with respect to the write target region exceeds a first threshold value; and reduce a second threshold value of a number of write retry processes, if the plurality of defective regions are arranged along the radial direction of the recording medium.

2. The storage apparatus as claimed in claim 1, wherein the controller is further configured to:
carry out an alternate process with respect to the write target region, if the number of write retry processes exceeds the second threshold value.

3. The storage apparatus as claimed in claim 2, wherein the controller is further configured to:
change a condition of the verify process with respect to the write target region, if the number of retry processes of the verify process is less than or equal to the first threshold value.

4. The storage apparatus as claimed in claim 1, wherein the controller is further configured to:
change a condition of the verify process with respect to the write target region, if the number of retry processes of the verify process is less than or equal to the first threshold value.

5. A storage apparatus comprising:
a recording medium;
a head configured to write information on and read information from the recording medium; and
a controller configured to control the head to carry out a write verify process which verifies whether or not information is correctly written by reading the information immediately after writing the information in a write target region of the recording medium,
wherein the controller is further configured to:
judge whether or not a defective region on the recording medium where a write retry process failed and a defective region on the recording medium where a servo error is generated are arranged along a radial direction of the recording medium, if a number of write retry processes of the verify process with respect to the write target region exceeds a threshold value; and
reduce the threshold value, if the defective region where the write retry process failed and the defective region where the servo error is generated are arranged along the radial direction of the recording medium.

6. The storage apparatus as claimed in claim 5, wherein the controller is further configured to:
carry out an alternate process with respect to the write target region, if the number of write retry processes with respect to the write target region exceeds the threshold value.

7. The storage apparatus as claimed in claim 6, wherein the controller is further configured to:
carry out a verify process with respect to the write target region, if the defective region in which the servo error is generated does not exist in the write target region.

8. The storage apparatus as claimed in claim 5, wherein the controller is further configured to:
carry out a verify process with respect to the write target region, if the defective region in which the servo error is generated does not exist in the write target region.

9. A computer-readable storage medium which stores a program for causing a computer to carry out a write verify process to verify whether or not information is correctly written immediately after writing the information in a write target region of a recording medium, said program comprising:
a procedure causing the computer to judge whether or not a plurality of defective regions on the recording medium where a verify process failed are arranged along a radial direction of the recording medium, if a number of retry processes of the verify process with respect to the write target region exceeds a first threshold value; and
a procedure causing the computer to reduce a second threshold value of a number of write retry processes, if the plurality of defective regions are arranged along the radial direction of the recording medium.

10. The computer-readable storage medium as claimed in claim 9, wherein said program further comprises:
a procedure causing the computer to carry out an alternate process with respect to the write target region, if the number of write retry processes exceeds the second threshold value.

11. The computer-readable storage medium as claimed in claim 10, wherein said program further comprises:
a procedure causing the computer to change a condition of the verify process with respect to the write target region, if the number of retry processes of the verify process is less than or equal to the first threshold value.

12. The computer-readable storage medium as claimed in claim 9, wherein said program further comprises:
a procedure causing the computer to change a condition of the verify process with respect to the write target region, if the number of retry processes of the verify process is less than or equal to the first threshold value.

13. A computer-readable storage medium which stores a program for causing a computer to carry out a write verify process to verify whether or not information is correctly written immediately after writing the information in a write target region of a recording medium, said program comprising:
a procedure causing the computer to judge whether or not a defective region on the recording medium where a write retry process failed and a defective region on the recording medium where a servo error is generated are arranged along a radial direction of the recording medium, if a number of write retry processes of the verify process with respect to the write target region exceeds a threshold value; and
a procedure causing the computer to reduce the threshold value, if the defective region where the write retry process failed and the defective region where the servo error is generated are arranged along the radial direction of the recording medium.

14. The computer-readable storage medium as claimed in claim 13, wherein said program further comprises:
a procedure causing the computer to carry out an alternate process with respect to the write target region, if the number of write retry processes with respect to the write target region exceeds the threshold value.

15. The computer-readable storage medium as claimed in claim 14, wherein said program further comprises:
a procedure causing the computer to carry out a verify process with respect to the write target region, if the defective region in which the servo error is generated does not exist in the write target region.

16. The computer-readable storage medium as claimed in claim 13, wherein said program further comprises:
a procedure causing the computer to carry out a verify process with respect to the write target region, if the defective region in which the servo error is generated does not exist in the write target region.

* * * * *